United States Patent [19]

Kress et al.

[11] Patent Number: 4,766,165
[45] Date of Patent: Aug. 23, 1988

[54] THERMOPLASTIC MOULDING COMPOSITIONS HAVING FLAME-RETARDING PROPERTIES

[75] Inventors: Hans-Jürgen Kress, Krefeld; Friedemann Müller, Neuss; Christian Lindner, Cologne; Horst Peters, Leverkusen; Josef Buekers, Krefeld; Gert Tödtemann, Wermelskirchen, all of Fed. Rep. of Germany

[73] Assignee: Bayer Aktiengesellschaft, Leverkusen, Fed. Rep. of Germany

[21] Appl. No.: 870,840

[22] Filed: Jun. 5, 1986

[30] Foreign Application Priority Data

Jun. 14, 1985 [DE] Fed. Rep. of Germany ....... 3521388

[51] Int. Cl.$^4$ .............................................. C08K 5/52
[52] U.S. Cl. .................................... 524/140; 524/141; 524/504; 524/520; 525/67; 525/68; 525/69; 525/146; 525/148
[58] Field of Search ............... 524/140, 141, 142, 504, 524/520, 130, 132, 135, 139; 525/67, 68, 69, 146, 148

[56] References Cited

U.S. PATENT DOCUMENTS

| Re. 31,165 | 3/1983 | Serini et al. | 525/147 |
| 3,005,795 | 10/1961 | Busse et al. | 525/146 |
| 3,294,871 | 12/1966 | Schmitt et al. | 525/146 |
| 3,404,122 | 10/1968 | Fritz et al. | 524/141 |
| 3,773,715 | 11/1973 | Largman et al. | 524/141 |
| 3,787,528 | 1/1974 | Benghiat | 524/130 |
| 3,809,676 | 5/1974 | Liberti | 524/135 |
| 3,953,539 | 4/1976 | Kawasi et al. | 524/116 |
| 4,172,859 | 10/1979 | Epstein | 428/402 |
| 4,178,281 | 12/1979 | Horn, Jr. | 524/120 |
| 4,251,425 | 2/1981 | Ohara et al. | 524/132 |
| 4,308,196 | 12/1981 | Limbert | 524/100 |
| 4,463,130 | 7/1984 | Serini et al. | 525/147 |
| 4,474,914 | 10/1984 | Spivack | 524/135 |
| 4,560,725 | 12/1985 | Van Bokhoven et al. | 525/67 |
| 4,564,654 | 1/1986 | Serini et al. | 525/147 |
| 4,649,168 | 3/1987 | Kress et al. | 524/132 |
| 4,657,955 | 4/1987 | Kress et al. | 524/130 |
| 4,692,488 | 9/1987 | Kress et al. | 524/139 |

FOREIGN PATENT DOCUMENTS

| 0019127 | 11/1980 | European Pat. Off. . |
| 103230 | 3/1984 | European Pat. Off. . |
| 174493 | 3/1986 | European Pat. Off. . |
| 183116 | 6/1986 | European Pat. Off. . |
| 2162437 | 8/1972 | Fed. Rep. of Germany . |
| 3516807 | 11/1986 | Fed. Rep. of Germany ...... 524/130 |
| 3523314 | 1/1987 | Fed. Rep. of Germany ...... 524/132 |
| 2223424 | 10/1974 | France . |
| 2239512 | 2/1975 | France . |
| 2427360 | 12/1979 | France . |
| 1401863 | 8/1975 | United Kingdom . |

Primary Examiner—John Kight
Assistant Examiner—Kriellion Morgan
Attorney, Agent, or Firm—Connolly and Hutz

[57] ABSTRACT

The present invention relates to flame-retarding moulding compositions which are based on thermoplastic polycarbonates, copolymers of styrenes and maleic anhydride, phosphorus compounds of the formula (I)

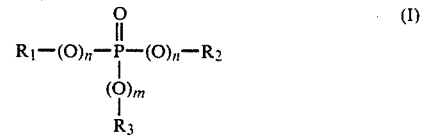

tetrafluoroethylene polymers, small amounts of graft polymers and optionally halogen compounds and which in addition can contain stabilizers, pigments, flow agents, release agents and/or antistatics, and to a process for their preparation.

16 Claims, No Drawings

THERMOPLASTIC MOULDING COMPOSITIONS HAVING FLAME-RETARDING PROPERTIES

Alloys of 5-95% by weight of aromatic polycarbonates and 95-5% by weight of styrene/maleic anhydride copolymers with 5-30% by weight of copolymerized maleic anhydride are thermoplastic moulding compositions which markedly surpass the polycarbonates, which they resemble in most of the technological properties, above all with respect to the resistance to hot water and with respect to the flowability of the melts during thermoplastic processing (German Patent Specification No. 2,252,974).

An essential disadvantage of the alloys of aromatic polycarbonates and styrene/maleic anhydride copolymers is, however, that thay fail the usual fire tests, for example the fire tests according to UL, Subject 94.

This disadvantage can admittedly be eliminated by the incorporation of suitable fire-proofing systems, for example of aromatic bromine compounds and of antimony trioxide, or by the use of bromine containing polycarbonates in combination with antimony trioxide (U.S. Pat. No. 4,151,218); however, this is accomplished at the price of the use of metal oxide compounds as flameproofing synergists, for example difficulties in processability, in particular at high temperatures. Mouldings obtained from them sometimes have a defective surface, for example with microcracks of streaks.

DE-OS (German Published Specification) No. 3,322,260 discloses flame-retarding thermoplastic moulding materials containing (a) aromatic polycarbonates, (b) SAN graft polymers, (c) thermoplastic polymers; preferred e.g. styrene;maleic anhydride copolymers, (d) if appropriate, halogen compounds, (e) antimony trioxide, antimony carbonate, bismuth trioxide or bismuth carbonate and (f) finely divided tetrafluoroethylene polymer, the latter being introduced into the moulding material via an aqueous emulsion of the SAN graft polymer (b) and, if appropriate, an aqueous emulsion of the thermoplastic polymer (c), whereby good surface in the moulding materials are achieved. According to page 16 of this DE-OS it is possible to transfer this kind of incorporation of tetrafluoroethylene polymers onto all polycarbonate-containing moulding materials.

DE-OS (German Published Specification) No. 3 130 774 discloses three component systems which are prepared from polycarbonates, styrene/maleic anhydride copolymers and ABS-graft polymers. These systems can contain usual additives like flame retardants. Details with reference to the flame retardants are not disclosed.

The present invention relates to thermoplastic moulding compositions which contain:

A. 50-90 parts by weight of thermoplastic aromatic polycarbonate,
B. 10-50 parts by weight of copolymer of random structure of
  1. 95-70% by weight, preferably 90-75% by weight, of styrene, α-methylstyrene, nuclear-alkylated styrene or mixtures of the said vinylaromatics and
  2. 5-30% by weight, preferably 10-25% by weight, of maleic anhydride,
C. 0-15 parts by weight of a low-molecular or high-molecular halogen compound, in particular a bromine compound, in each case relative to 100 parts by weight of A.+B. and C., the halogen content which results from the components A.+C. being intended to be in each case between 3 and 10% by weight, relative to the total weight of the components A.+C., and which are characterized in that they additionally contain D. 1-20 parts by weight, preferably 2-15 parts by weight, relative to 100 parts by weight of A.+B. and if appropriate C., of a phosphorus compound of the formula (I)

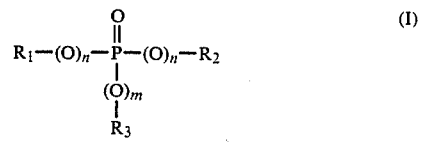

wherein
$R_1$, $R_2$ and $R_3$ independently of one another are optionally halogenated $C_1$-$C_8$-alkyl or optionally halogenated $C_6$-$C_{20}$-aryl and
n and m independently of one another represent 0 or 1, and E. 0.05-2.0 parts by weight, in particular 0.1-1.0 parts by weight, relative to 100 parts by weight of A.+B. and if appropriate C., of a tetrafluoroethylene polymer with mean particle sizes of 0.05-20 μm and a density of 1.2-1.9 g/cm³, the component E. being employed in the form of a coagulated mixture of emulsions of the tetrafluoroethylene polymers E. with emulsions of graft polymers F. obtained from F.1 5-90 parts by weight, preferably 30-80 parts by weight, of a mixture of:
F.1.1 50-95% by weight of styrene, α-methylstyrene, nuclear-substituted styrene, methylmethacrylate or mixtures thereof and
F.1.2 50-5% by weight of (meth)acrylonitrile, methyl methacrylate, maleic anhydride, N-substituted maleimide or mixtures thereof, on
F.2. 95-10 parts by weight, preferably 70-20 parts by weight, of a rubber having a glass temperature $T_G$ of $\leq 10°$ C., the weight ratio of graft polymer F. to tetrafluoroethylene polymer E. being between 95:5 and 60:40, and the content of F., relative to 100 parts by weight of A.+B. and if appropriate C., being between 0.1 and 3.0 parts by weight, and optionally contain effective amounts of stabilizers, pigments, flow agents, release agents and/or antistatics.

Thermoplastic aromatic polycarbonates, suitable according to the invention, corresponding to component A. are those based on the diphenols of the formula (II)

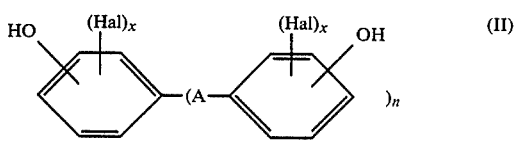

wherein
A is a single bond, $C_1$-$C_5$-alkylene, $C_2$-$C_5$-alkylidene, $C_5$-$C_6$-cycloalkylidene, —S—, or —SO$_2$—,
Hal is chlorine or bromine,
x is 0, 1 or 2 and
"n" is 1 or 0.

Polycarbonates suitable according to the invention, corresponding to component A., are either homopolycarbonates or copolycarbonates of the diphenols (II).

The diphenols of the formula (II) are either known from the literature or can be prepared by processes known from the literature.

The preparation of the polycarbonates, suitable according to the invention, corresponding to component A. is known from the literature and can be carried out, for example, with phosgene by the phase boundary process or with phosgene by the process in homogeneous phase (the so-called pyridine process), the molecular weight which is to be set in a particular case being obtained in a known manner by an appropriate quantity of known Chain stoppers.

The polycarbonates, suitable according to the invention, corresponding to component A. have mean weight average molecular weights ($\overline{M}w$, measured, for example, by ultracentrifuging or scattered light measurement) from 10,000 to 200,000, preferably from 20,000 to 80,000.

Examples of suitable diphenols of the formula (II) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis(3,5-dibromo-4-hydroxyphenyl)-propane.

Preferred diphenols of the formula (II) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The polycarbonates, suitable according to the invention, corresponding to component A. can be branched in a known manner, and in particular preferably by the incorporation of 0.05 to 2.0 mol %, relative to the total of diphenols employed, of trifunctional or more than trifunctional compounds, for example those having three or more than three phenolic OH groups.

Preferred polycarbonates in addition to the bisphenol A homopolycarbonate are the copolycarbonates of bisphenol A with up to 15% by weight, relative to the total of diphenols, of 2,2-bis-(3,5-dibromo-4-hydroxyphenyl)-propane.

The styrene/maleic anhydride copolymers, suitable according to the invention, corresponding to component B. have a random structure. Such copolymers of random structure can be prepared from the corresponding monomers preferably by continuous bulk or solution polymerization with incomplete conversions.

Examples of suitable nuclear-alkylated styrenes are p-methylstyrene, vinyltoluene, 2,4-dimethylstyrene and mixtures thereof.

The molecular weights ($\overline{M}w$. weight average) of the styrene/maleic anhydride copolymers, Suitable according to the invention, of random structure corresponding to component B. can vary over a wide range. The range from 60,000 to about 200,000 or an intrinsic viscosity number [$\eta$] from 0.4 to 0.9 (measured in dimethylformamide at 25° C.; in this connection see Hoffmann, Krömer, Kuhn, Polymeranalytik [Polymer Analysis] I., Stuttgart 1977, pages 316 et seq.) is preferred.

Organic halogen compounds C., suitable according to the invention, are in principle all those which are non-volatile during the preparation and processing of the moulding compositions according to the invention and are thermally stable, that is to say do not eliminate halogen during the preparation and processing and can thus exert a flame-retarding action in the case of fire. Decabromodiphenyl ether, octabromodiphenyl, octabromodiphenyl ether and tribromotetrachlorotoluene and also oligomeric bromine compounds such as, for example, oligocarbonates based on tetrabromobisphenol A and finally also polymeric bromine compounds such as, for example, high-molecular polycarbonates based on tetrabromobisphenol A or nuclear-brominated polyphenylene oxides are particularly suitable.

The halogen content resulting from the component C. can thus also be introduced via the high-molecular polycarbonate corresponding to component A.

The phosphorus compounds, to be employed according to the invention, corresponding to component D. are generally known (see, for example, Ullmann, Enzyklopädie der technischen Chemie [Encyclopaedia of Industrial Chemistry], volume 18, pages 301 et seq., 1979).

Optionally halogenated $C_1$–$C_8$-alkyl radicals corresponding to $R_1$, $R_2$ or $R_3$ of the formula (I) are chloroethyl, 2-chloropropyl, 2,3-dibromopropyl, butyl, methyl and octyl.

Optionally halogenated $C_6$–$C_{20}$-aryl radicals corresponding to $R_1$, $R_2$ or $R_3$ of the formula (I) are chlorophenyl, bromophenyl, pentachlorophenyl, pentabromophenyl, phenyl, cresyl, isopropylphenyl and naphthyl.

Phosphorus compounds, which can be employed according to the invention, corresponding to the formula (I) are tributyl phosphate, tris-2-chloroethyl phosphate, tris-2,3-dibromopropyl phosphate, triphenyl phosphate, tricresyl phosphate, diphenyl cresyl phosphate, diphenyl octyl phosphate, diphenyl 2-ethylcresyl phosphate, triisopropylphenyl phosphate, halogen-substituted aryl phosphates, dimethyl methylphosphonate, diphenyl methylphosphonate, diethyl phenylphosphonate, triphenylphosphine oxide and tricresylphosphine oxide.

The tetrafluoroethylene polymers, suitable according to the invention, corresponding to component E. are polymers having fluorine contents of 65–76% by weight, preferably 70–76% by weight. Examples are polytetrafluoroethylene, tetrafluoroethylene/hexafluoropropylene copolymers or tetrafluoroethylene copolymers with small quantities of fluorine-free copolymerizable, ethylenically unsaturated monomers. Such polymers are known. They can be prepared by known processes such as, for example, by polymerization of tetrafluoroethylene in an aqueous medium with a catalyst which forms free radicals, for example sodium, potassium or ammonium peroxidisulphate, under pressures of 7–71 kg/cm$^2$ and at temperatures of 0°–200° C., preferably at temperatures of 20°–100° C. (for more details, see, for example, U.S. Pat. No. 2,393,967).

The polytetrafluoroethylenes suitable according to the invention have mean particle sizes of 0.05 to 20 $\mu$m, preferably 0.08 to 10 $\mu$m, and a density of 1.2–1.9 g/cm$^3$.

As a result of the addition of tetrafluoroethylene polymers, especially the dripping-off of the moulding composition melt during the course of the fire is reduced or completely prevented.

If the moulding compositions according to the invention are then prepared, for example, by melt-compounding in kneaders or extruders from granules or powders of the components A. to D. and a polytetrafluoroethylene powder of higher mean particle sizes and densities than those of the polytetrafluoroethylenes according to the invention, moulding compositions of high flame retardance are admittedly obtained; however, mouldings obtained from these sometimes have a defective surface, for example microcracks or streaks.

This is avoided with certainty when the very finely dispersed and, in addition, unsintered tetrafluoroethylene polymers are employed in the form of a coagulated mixture of emulsions of the tetrafluoroethylene polymers E. with emulsions of the graft polymers F.

To prepare an appropriate mixture, an aqueous emulsion (latex) of a graft polymer F. with mean latex particle sizes of 0.1 to 2.0 μm, in particular 0.2 to 0.6 μm, is first mixed with a finely disperse emulsion of a tetrafluoroethylene polymer in water with mean particle sizes of 0.05 to 20 μm, in particular of 0.08 to 10 μm; suitable tetrafluoroethylene polymer emulsions usually have solids contents of 30 to 70% by weight, in particular of 50-60% by weight. The emulsions, which are to be employed, of the graft polymers F. have solids contents of 25 to 60% by weight, in particular of 30 to 45% by weight.

In the emulsion mixture, the graft polymer F./tetrafluoroethylene polymer E. weight ratio is between 95:5 and 60:40. The emulsion mixture is then coagulated in a known manner, for example by spray-drying, freeze-drying or coagulation by means of addition of inorganic or organic salts, acids, bases or organic water-miscible solvents, such as alcohols and ketones, preferably at temperatures of 20° to 150° C., in particular of 50° to 100° C. If necessary, drying can be carried out at 50° to 200° C., preferably 70° to 100° C.

Suitable tetrafluoroethylene polymer emulsions are commercially available products and are on offer, for example, from Messrs. DuPont as Teflon ® 30 N.

With respect to the difficult processing of polytetrafluoroethylenes, reference should also be made to French Patent Specification No. 1,412,767; with respect to the incorporation of polytetrafluoroethylenes into thermoplastics, such as aromatic polycarbonates or polymers of unsaturated monomers, reference should also be made to U.S. Pat. No. 3,294,871 and to U.S. Pat. No. 3,005,795, in particular columns 3/4, where precipitation and coagulation are mentioned.

Rubbers suitable for the preparation of the graft polymers corresponding to component F. are in particular polybutadiene, butadiene/styrene copolymers with up to 30% by weight, relative to the rubber weight, of a lower alkyl ester of acrylic or methacrylic acid (for example methyl methacrylate, ethyl acrylate, methyl acrylate or ethyl methacrylate). Examples of further suitable rubbers are polyisoprene or polychloroprene. Moreover, alkyl acrylate rubbers based on $C_1$-$C_8$-alkyl acrylates, especially ethyl, butyl and ethylhexyl acrylate, are suitable. These alkyl acrylate rubbers can optionally contain up to 30% by weight, relative to the rubber weight, of copolymerized monomers such as vinyl acetate, acrylonitrile, styrene, methyl methacrylate and/or vinyl ethers. These alkyl acrylate rubbers can also contain relatively small quantities, preferably up to 5% by weight relative to the rubber weight, of ethylenically unsaturated monomers having a crosslinking action. Examples of such crosslinking agents are alkylene diol di(meth)-acrylates, polyester di-(meth)-acrylates, divinylbenzene, trivinylbenzene, triallyl cyanurate, allyl (meth)-acrylate, butadiene or isoprene. Such alkyl acrylates are known. Acrylate rubbers as the grafting base can also be products which contain, as the core, a crosslinked diene rubber consisting of one or more conjugated dienes, such as polybutadiene, or a copolymer of a conjugated diene with an ethylenically unsaturated monomer such as styrene and/or acrylonitrile. Examples of other suitable rubbers are EPDM rubbers, that is to say rubbers consisting of ethylene, propylene and an unconjugated diene monomer.

The preferred rubbers for the preparation of the graft polymers F. are diene rubbers and alkyl acrylate rubbers.

The rubbers are present in the graft polymers F. in the form of at least partially crosslinked particles of a mean particle size of 0.1 to 2.0 μm, in particular 0.2 to 0.6 μm. The graft polymers F. are prepared by free-radical graft copolymerization of the above-defined monomer mixtures of F.1.1 and F.1.2 in the presence of the rubbers F.2 which are to be grafted, and all of these are known. Preferred preparation processes for the graft polymers F. are emulsion polymerization, solution polymerization, bulk polymerization or suspension polymerization. Particularly preferred graft polymers F. are the so-called ABS polymers. As nuclear-substituted styrenes, halogenostyrenes and p-methylstyrene may be mentioned.

Since the graft polymers F. to be used according to the invention are employed by prior mixing of the emulsions with emulsions of the component E., it is most expedient to prepare the component F. by the process of emulsion polymerization.

The polytetrafluoroethylene E./graft polymer F. ratio employed should be selected such that the total content of F. in the mixture of A.+B. and if appropriate C. is between 0.1 and 3.0 parts by weight.

The thermoplastic moulding compositions according to the invention can contain further additives known for polycarbonates or for the thermoplastic polymers, such as stabilizers, pigments, flow agents, release agents and/or antistatics.

The moulding compositions according to the invention, containing the components A., B., D., E and F as well as, if appropriate, C. and/or optionally further known additives, such as stabilizers, pigments, flow agents, release agents and/or antistatics, are prepared by mixing the particular ingredients in a known manner and melt-compounding or melt-extruding the mixtures at temperatures of 200°-330° C. in customary units, such as internal kneaders, extruders or twin-shaft screws, or by mixing the solutions of the particular components in suitable organic solvents, for example in chlorobenzene, and evaporating the solution mixtures in customary units, for example in evaporation extruders.

The present invention therefore also relates to a process for the preparation of thermoplastic moulding compositions, containing the components A., B., D., E., F. and if appropriate the component C., stabilizers, pigments, flow agents, release agents and/or antistatics, which process is characterized in that the components A., B., D., E., F. and if appropriate the component C., stabilizers, pigments, flow agents, release agents and/or antistatics are mixed in a known manner and then melt-compounded or melt-extruded at temperatures of 200°-330° C. in customary units, or that the solutions of these components in suitable organic solvents are mixed and the solution mixtures are then evaporated in customary units.

The mixing of the individual ingredients can be carried out in a known manner either successively or simultaneously, and in particular either at about 20° C. (room temperature) or at a higher temperature. The component D. can here also be employed as a previously prepared concentrate in A. or B.

The moulding compositions of the present invention can be used for the production of mouldings of any type. In particular, mouldings can be produced by injection-moulding. Examples of mouldings which can be produced are: casing parts of any kind (for example for domestic appliances, such as juice presses, coffee machines, mixers) or cover panels for the building sector and components for the motorcar sector. In addition, they are used in the electrical engineering field, because they have very good electrical properties.

A further form of processing is the production of mouldings by deep-drawing or hot-forming of sheets or films previously produced by extrusion.

The particle size always denotes the mean particle diameter $d_{50}$, determined by measurements in the ultracentrifuge in accordance with W. Scholtan et al., Kolloid-Z. und Z. Polymere 250 (1972) 782–796.

EXAMPLES

Alloy components used

A.

Polycarbonate of 2,2-bis-(4-hydroxyphenyl)-propane (bisphenol A) having a relative solution viscosity of 1.320, measured in methylene chloride at 23° C. and in a concentration of 0.5% by weight.

Preparation of the copolymer resins B 750 parts of a mixture having a composition according to Table 1 are introduced into a jacketed vessel which is provided with internal thermometer, stirrer, inlet and outlet, and heated to 130° C. A monomer stream of 110 parts of the same composition is then metered in and simultaneously the same quantity of polymer solution is withdrawn from the vessel, in such a way that the level in the vessel is kept constant. About 0.05 part/hour of tert.-butyl perpivalate (75% in dibutyl phthalate) is continuously added to the monomer stream. After about 2 hours, a constant conversion of about 40% has been established. 0.1% by weight of 2,6-di-t-butyl-p-cresol is added to the polymer solution and the solution is then freed in an evaporative extruder from monomers and volatile constituents.

TABLE 1

| Composition of the feed monomers and of the copolymers B. | | | |
|---|---|---|---|
| Feed monomers (% by weight) | | Copolymer (% by weight) | |
| Styrene | Maleic anhydride | Styrene | Maleic anhydride |
| B.1 93.2 | 6.8 | 83 | 17 |
| B.2 92.0 | 8.0 | 80 | 20 |

D. Triphenyl phosphate

E.1 Tetrafluoroethylene polymer as a coagulated mixture of an SAN graft polymer F. and a tetrafluoroethylene polymer emulsion in water. Tetrafluoroethylene polymer content in the mixture: 10% by weight, relative to the PTFE-SAN graft polymer mixture. The tetrafluoroethylene polymer emulsion has a solids content of 60%; the particle size is between 0.05 and 0.5 μm.

Preparation of E.1: The emulsion of the tetrafluoroethylene polymer was mixed with the emulsion of the SAN graft polymer F. and stabilized with 1.8% by weight, relative to the polymer solid, of phenolic antioxidants. At 85°–95° C., the mixture is coagulated with an aqueous solution of $MgSO_4$ (Epsom salt) and acetic acid at pH 4–5, filtered and washed until virtually free of electrolyte and then freed by centrifuging from the major quantity of water and subsequently dried at 100° C. to give a powder. This powder can then be compounded with the further components in the units described.

E.2 Tetrafluoroethylene polymer in powder form with a particle size of 500–650 μm and a density of 2.18 to 2.20 $g/cm^3$, from Hoechst (Hostaflon TF 2026).

F. SAN graft polymer of 50% by weight of styrene/acrylonitrile mixture (in a weight ratio of 72:28) on 50% of particulate polybutadiene of a mean particle size ($d_{50}$) of 0.4 μm, obtained by emulsion polymerization.

The compounding of the components A., B., D. and E. was carried out in a 3-liter internal kneader at temperatures between 200° and 220° C.

The mouldings were prepared in an injection-moulding machine at 260° C.

The fire behaviour of the samples was measured according to UL subject 94 V in test specimen thicknesses of 1.6 and 3.2 mm. The UL 94 V test is carried out as follows:

Substance samples are formed into bars of dimensions 127×12.7×1.6 mm or 127×12.7×3.2 mm. The bars are mounted vertically in such a way that the underside of the specimen is located 305 mm above a strip of dressing material. Each test bar is ignited individually by means of two successive ignition steps of 10 seconds duration. The burning properties are observed after each ignition step and the sample is assessed accordingly. For igniting the specimen, a Bunsen burner having a 10 mm (⅜ inch) high blue flame of natural gas having a heat capacity of $3.73 \times 10^4$ $kH/m^3$ (1,000 BTU per cubic foot) is used.

The UL 94 V-0 classification comprises the properties, described below, of materials which were tested in accordance with UL 94 instructions. The materials in this class do not contain any samples which burn longer than 10 seconds after each action of the test flame; they show no total burning time of more than 50 seconds during the two actions of flame on each set of samples; they do not contain any samples which burn off completely up to the holding clamp fixed to the upper end of the sample; they do not have any samples which ignite the cottonwool, located underneath the sample, by burning drips or particles; they also do not contain any samples which smoulder for more than 30 seconds after removal of the test flame.

Other UL 94 classifications designate samples which have a longer afterburning time (classification V-1) or which additionally release burning drips or particles which ignite the cottonwool located underneath the sample (classification V-2). The classification "f." means "failed" and denotes that the samples have an afterburning time of ≧30 seconds.

The evaluation of the moulding surface with respect to surface defects, such as streaks, was carried out visually on test specimens of dimensions 127×12.7×1.6 mm.

The determination of the notched impact strength was carried out analogously to DIN 53 453/ISO R 179 on standard small bars of dimensions 50×6×4 mm, the bars being provided with a V-shaped notch of notch depth 2.7 mm for the notched impact strength.

The precise compositions of the moulding compositions tested and the test data obtained are to be found in the table which follows:

| | A (Parts by weight) | B1. (Parts by weight) | B.2 (Parts by weight) | D (Parts by weight) | E.1 (Parts by weight) | E.2 (Parts by weight) | UL-94 V 3.2 mm | UL-94 V 1.6 mm | Notched impact strength | Surface properties |
|---|---|---|---|---|---|---|---|---|---|---|
| Comparison tests | | | | | | | | | | |
| V1 | 80 | 20 | | | | | f.* | f. | 18 | |
| V2 | 80 | | 20 | | | | f. | f. | 12 | |
| V3 | 70 | 30 | | 10 | | 0.25 | V0 | V1 | — | streaks |
| Tests according to the present invention | | | | | | | | | | |
| E1 | 80 | 20 | | 10 | 3.0 | | V0 | V0 | 12 | streak-free |
| E2 | 70 | 30 | | 10 | 3.0 | | V0 | — | 16 | streak-free |
| E3 | 80 | | 20 | 10 | 3.0 | | V0 | V0 | 13 | streak-free |
| E4 | 70 | | 30 | 10 | 3.0 | | V0 | V1 | 15 | streak-free |

*f. = failed

We claim:
1. A thermoplastic moulding composition, containing
(A) 50-90 parts by weight of a thermoplastic aromatic polycarbonate, based on the diphenols consisting essentially of the formula

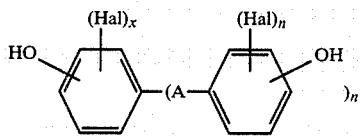

wherein
A is a single bond, $C_1-C_5$-alkylene, $C_2-C_5$-alkylidene, $C_5-C_6$-cycloalkylidene, —S— or —$SO_2$—, Hal is chlorine or bromine, x is 0, 1 or 2 and "n" is 1 or 0;
(B) 10-50 parts by weight of a copolymer of random structure of
1. 95-70% by weight of vinyl aromatic(s) selected from styrene, α-methylstyrene, nuclear-alkylated styrene and mixtures thereof and
2. 5-30% by weight of maleic anhydride,
(C) 0-15 parts by weight of a low-molecular or high-molecular halogen compound, in each case relative to 100 parts by weight of components (A) and (B) and (C), the halogen content which results from the components (A) and (C) being in each case between 3 and 10% by weight, relative to the total weight of the components (A) and (C), characterized in that they additionally contain 1-20 parts by weight, relative to 100 parts by weight of components (A) and (B) and, if present, (C), of a phosphorous compound of the formula

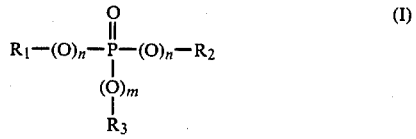

wherein
$R_1$, $R_2$ and $R_3$ independently of one another represent an optionally halogenated $C_6-C_{20}$-aryl radical and n and m independently of each other are 0 or 1, and
(E) 0.05-2.0 parts by weight, relative to 100 parts by weight of (A) and (B) and, if present, (C), of a tetrafluoroethylene polymer with mean particle sizes of 0.05-20 μm and a density of 1.2-1.9/cm³, the component (E) being employed in the form of a coagulated mixture of emulsions of the tetrafluoroethylene polymers (E) with emulsions of graft polymers (F) obtained from
(1) 5-90 parts by weight of a mixture of:
  (i) 50-95% weight of styrene, α-methylstyrene, nuclear-substituted styrene, methyl methacrylate or mixtures thereof and
  (ii) 50-5% by weight of (meth)-acrylonitrile, methyl methacrylate, maleic anhydride, N-substituted maleimide or mixtures thereof on
(2) 95-10 parts by weight of a rubber having a glass temperature $T_G$ of $\leq 10°$ C., and the weight ratio of (F)/(E) being between 95:5 and 60:40 and the content of component (F), relative to 100 parts by weight of (A) and (B) and, if present (C) being between 0.1 and 3.0 parts by weight.

2. A moulding composition according to claim 1, in which the thermoplastic aromatic polycarbonate of component (A) is a bisphenol A homopolycarbonate or is a copolycarbonate of bisphenol A with up to 15% by weight, relative to the total weight of diphenols, of 2,2-bis-(3,5-dibromo-4-hydroxyphenyl)-propane.

3. A moulding composition according to claim 1, in which the copolymer of component (B) comprises, as the nuclear-alkylated styrene of monomer(s) 1 , p-methylstyrene, vinyltoluene, 2,4-dimethylstyrene or a mixture thereof.

4. A moulding composition according to claim 1, in which the compolymer of component (B) consists of monomer(s) 1 in an amount of 90-75% by weight and maleic anhydride in an amount of 10 to 25% by weight.

5. A moulding composition according to claim 1, in which the halogen compound of component (C) is a bromine compound.

6. A moulding composition according to claim 1, in which the halogen compound of component (C) is any of those hereinbefore specifically mentioned.

7. A moulding composition according to claim 1, in which component (D) is present in a quantity of 2 to 15 parts by weight.

8. A moulding composition according to claim 1, in which component (E) is present in a quantity of 0.1 to 1.0 part by weight.

9. A moulding composition according to claim 1 in which the graft polymer (F) has been prepared from 30 to 80 parts by weight of the mixture (1) on 70 to 20 parts by weight of the rubber (2).

10. A moulding composition according to claim 1, additionally containing at least one additive selected from stabilizers, pigments, flow agents, release agents and antistatics.

11. Any one of the moulding compositions according to claim 1, which are hereinbefore specifically indentified.

12. A process for the production of a moulding composition according to claim 1, in which the components (A), (B), (D), (E) and (F) and, if present, (C) are mixed together and then melt-compounded or melt-extruded at temperatures of 200° to 330° C. in a melt-compounding or melt-extrusion unit.

13. A process for the production of a moulding compositions according to claim 1, in which a solution of components (A), (B), (D), (E) and (F) and, if present, (C) is mixed in suitable organic solvent(s) and the solution mixture is then evaporated in an evaporation unit.

14. A process according to claim 12 or the production of a moulding composition in which at least one additive selected from stabilizers, pigments, flow agents, release agents and antistatics is included in the mixture or solution.

15. A moulding composition whenever produced by the process of claim 12.

16. A moulded article whenever formed of a moulding composition according to claim 1.

* * * * *